(12) United States Patent
Zhu et al.

(10) Patent No.: US 12,468,420 B2
(45) Date of Patent: Nov. 11, 2025

(54) ELECTRONIC DEVICE FOR DETERMINING AN ACTIVATION STATUS OF A TOUCH SENSOR

(71) Applicant: Infineon Technologies AG, Neubiberg (DE)

(72) Inventors: Hanyu Zhu, Shenzhen (CN); Rongbin Qiu, Shanghai (CN)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/805,995

(22) Filed: Aug. 15, 2024

(65) Prior Publication Data

US 2025/0077023 A1    Mar. 6, 2025

(30) Foreign Application Priority Data

Aug. 30, 2023 (WO) ................. PCT/CN2023/115866

(51) Int. Cl.
*G06F 3/041* (2006.01)
*G06F 3/044* (2006.01)

(52) U.S. Cl.
CPC ........ *G06F 3/04166* (2019.05); *G06F 3/0443* (2019.05)

(58) Field of Classification Search
CPC ................................................ G06F 3/041662
See application file for complete search history.

(56) References Cited

U.S. PATENT DOCUMENTS

| | | | |
|---|---|---|---|
| 8,773,146 B1 | 7/2014 | Hills et al. | |
| 8,982,097 B1 | 3/2015 | Kuzo et al. | |
| 10,824,270 B1* | 11/2020 | Wang | G06F 3/0418 |
| 2016/0259448 A1 | 9/2016 | Guarneri | |
| 2018/0011596 A1 | 1/2018 | Korapati et al. | |
| 2019/0079613 A1 | 3/2019 | Zhang et al. | |
| 2019/0227669 A1 | 7/2019 | Maharyta et al. | |
| 2020/0387249 A1* | 12/2020 | Shimada | G06F 3/04186 |
| 2022/0027012 A1* | 1/2022 | Kim | G06F 3/0448 |
| 2022/0077854 A1 | 3/2022 | Li et al. | |
| 2022/0382395 A1* | 12/2022 | Xu | G06V 40/1306 |

FOREIGN PATENT DOCUMENTS

WO    2015023410 A1    2/2015
WO    2016064438 A1    4/2016

* cited by examiner

*Primary Examiner* — Robin J Mishler
(74) *Attorney, Agent, or Firm* — Harrity & Harrity, LLP (57) ABSTRACT

An electronic device for determining a status of a touch sensor includes a capacitance measurement circuit to be coupled to a touch sensor including first and second electrodes, the capacitance measurement circuit being configured to obtain a first measurement result based on a self-capacitance of the first electrode and a second measurement result based on a mutual capacitance between the first and the second electrodes. An algorithm may be applied to the first and second measurement results, thereby generating a signal. A threshold comparator is configured to compare the signal to a threshold, and to generate a comparison signal having a first value if the signal is greater than the threshold and a second value if the signal is less than the threshold. An output module is configured to provide an output signal indicative of the status of the touch sensor based on the comparison signal.

20 Claims, 5 Drawing Sheets

ELECTRONIC DEVICE FOR DETERMINING AN ACTIVATION STATUS OF A TOUCH SENSOR

CROSS-REFERENCE TO RELATED APPLICATION

This application claims priority to PCT Application No. PCT/CN2023/115866 filed on Aug. 30, 2023, the content of which is incorporated by reference herein in its entirety.

TECHNICAL FIELD

The present disclosure relates to an electronic device for determining an activation status of a touch sensor, to a touch sensor device comprising such an electronic device, and to method of determining an activation status of a touch sensor.

BACKGROUND

Traditional car door entry systems have long relied on mechanical door handles, mechanical buttons, or switches to enable the locking and unlocking of doors. However, these mechanisms have inherent limitations, such as susceptibility to wear and tear, regular maintenance requirements, and a potential lack of intuitive user experience. Furthermore, such systems may compromise the overall aesthetics of the vehicle. More modern approaches feature capacitive touch buttons that are aesthetically integrated into the car door such that no door handle protrudes from the door surface. However, state-of-the-art capacitive touch sensors are unable to distinguish between a user's hand or finger, and water that is in contact with a touch surface of the sensor. This can lead to undesired locking and unlocking of car doors when exposed to water, e.g., under rainy conditions or during a carwash.

SUMMARY

In some implementations, an electronic device for determining an activation status of a touch sensor includes a capacitance measurement circuit to be coupled to a touch sensor including a first electrode and a second electrode, wherein the capacitance measurement circuit is configured to obtain a first measurement result based on a self-capacitance of the first electrode and a second measurement result based on a mutual capacitance between the first and the second electrodes. An algorithm module of the electronic device is configured to apply an algorithm to the first and second measurement results, thereby generating a resultant signal, whereas a threshold comparator of the electronic device is configured to compare the resultant signal to a threshold value, thereby generating a comparison result. The electronic device further includes an output module configured to provide an output signal based on the comparison result, wherein the output signal is indicative of the activation status of the touch sensor.

In some implementations, a touch sensor device includes such an electronic device and a touch sensor including a first electrode and a second electrode, wherein the capacitance measurement circuit is coupled to the first and second electrodes of the touch sensor.

In some implementations, a method of determining an activation status of a touch sensor includes measuring a self-capacitance on a first electrode of the touch sensor, measuring a mutual capacitance between the first electrode and a second electrode of the touch sensor, generating a resultant signal by applying an algorithm to the measured self-capacitance and mutual capacitance, generating a comparison result by comparing the resultant signal to a threshold value, and determining, based on the comparison result, the activation status of the touch sensor.

Those skilled in the art will recognize additional features and advantages upon reading the following detailed description, and upon viewing the accompanying drawings.

BRIEF DESCRIPTION OF THE DRAWINGS

The present disclosure is illustrated by way of example, and not by way of limitation, in the figures of the accompanying drawings in which like reference numerals refer to similar or identical elements. The elements of the drawings are not necessarily to scale relative to each other. The features of the various illustrated examples can be combined unless they exclude each other.

DETAILED DESCRIPTION

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

Each of the illustrated x-axis, y-axis, and z-axis is substantially perpendicular to the other two axes. In other words, the x-axis is substantially perpendicular to the y axis and the z-axis, the y-axis is substantially perpendicular to the x-axis and the z axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Analogously, if a component is described to generate an output signal based on an input signal, it can directly generate the output signal from the input signal or from a signal that is derived from the input signal, e.g., a filtered input signal.

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

State-of-the-art touch sensors typically lack the ability to distinguish between an intended touch (or activation) event by a human body part, e.g., a finger, and unintended touch (non-touch) events if water flows across the touch sensitive surface of the touch sensor, for instance. This is particularly relevant for touch sensors that could at least temporarily be exposed to water such as rain, snow or ice. A typical example of an application for such touch sensors are door handles of a car, which on modern cars are increasingly realized as capacitive touch buttons aesthetically integrated into the car door such that no door handle protrudes from the door surface. Upon a touch of the touch sensor, the car doors lock or unlock, e.g., if the physical car key is within a certain distance from the car. Unwanted activation of such touch sensors due to water or a malfunction of such a touch sensor when covered with water is undesirable. Hence, a touch sensor to be employed in applications, in which it may be exposed to water, ideally can distinguish between a water flow across the sensor, an intended touch activation, and a touch activation during coverage with water.

Some implementations disclosed herein are directed to an electronic device for determining an activation status of a touch sensor. The electronic device comprises a capacitance measurement circuit that is to be coupled to a touch sensor, which in turn comprises a first electrode and a second electrode. The capacitance measurement circuit is configured to obtain a first measurement result that is based on a self-capacitance of the first electrode, and a second measurement result that is based on a mutual capacitance between the first electrode and the second electrode. The electronic device further comprises an algorithm module that is configured to apply an algorithm to the first and second measurement results, thereby generating a resultant signal. The electronic device further comprises a threshold comparator that is configured to compare the resultant signal to a threshold value, and to generate a comparison signal of a first comparison value if the resultant signal is greater than the threshold value, and of a second comparison value if the resultant signal is less than the threshold value. The electronic device further comprises an output module that is configured to provide an output signal that is based on the comparison result, wherein the output signal is indicative of the activation status of the touch sensor.

In some implementations, the output module can be configured to generate the output signal indicating an activation status of the touch sensor when the comparison result has the first comparison value, and no activation when the comparison result has the second comparison value. The threshold value in some implementations may represent an activation level up the touch sensor with the conductive object, in particular a human body part such as a finger, on the touch sensor.

Some further implementations disclosed herein are directed to a touch sensor device comprising an electronic device according to the implementation disclosed above, and a touch sensor that has a first electrode and a second electrode. In such implementations, the capacitance measurement circuit of the electronic device is coupled to the first electrode and the second electrode of the touch sensor.

Some further implementations disclosed herein are directed to a method of determining an activation status of a touch sensor. The method comprises measuring a self-capacitance on a first electrode of the touch sensor, measuring a mutual capacitance between the first electrode and a second electrode of the touch sensor, and generating a resultant signal by applying an algorithm to the measured self-capacitance and mutual capacitance. The method further comprises generating a comparison result by comparing the resultant signal to a threshold value and determining based on the comparison result of the activation status of the touch sensor.

Providing a touch sensor device or an electronic device to be coupled to a touch sensor, wherein acquiring both the self-capacitance and the mutual capacitance enables the distinction between an intended touch event by a human finger and unwanted touch event caused by water flowing across the touch sensor, for instance.

Figure 1:
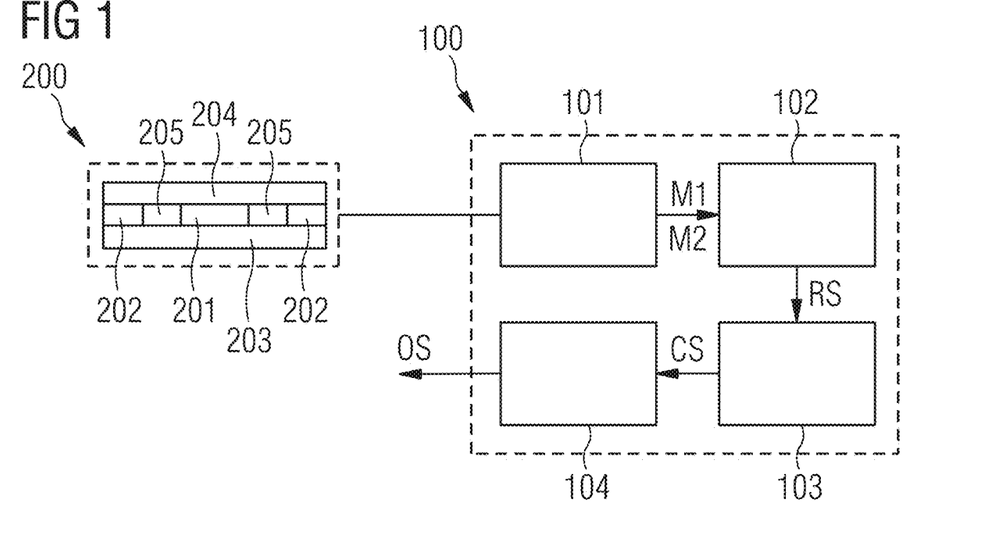
FIG. 1 illustrates a schematic block diagram of an example touch sensor device, according to one or more implementations.

FIG. 1 is a schematic block diagram of a touch sensor device 300 according to one or more implementations. In particular, the touch sensor device 300 includes a touch sensor 200, and an electronic device 100 for determining an activation status of the touch sensor 200. The touch sensor device 300 may comprise one or more touch sensors 200 and one or more electronic devices 100. The touch sensor 200 comprises a first electrode 201 and a second electrode 202 that both are arranged on a substrate body 203, for instance. The first electrode 201 and the second electrode 202 can be separated by an electrically non-conductive gap 205, e.g., a void or a dielectric material, that is arranged between the first and the second electrodes 201, 202. For example, the second electrode 202 surrounds the first electrode 201 at least partially. The touch sensor 200 can further comprise a protective cover 204 serving as a protection layer and touch surface of the touch sensor 200. Thus, the touch sensor 200 forms a capacitive touch sensor that is known to the skilled person and not further detailed throughout this disclosure. The one or more touch sensors 200 may provide sensor signals to the one or more electronic devices 100 for processing and for activation detection. For simplicity, in the following a touch sensor device 300 with a single touch sensor 200 that is coupled to an electronic device 100 is described. However, the working principle is expandable to an implementation with multiple touch sensors 200 and electronic devices 100 in a straightforward manner.

The electronic device 100 in this example implementation includes a capacitance measurement circuit 101 that is electrically coupled to the touch sensor 200 and is configured to receive the sensor signals. In particular, the capacitance measurement circuit 101 is configured to obtain a first measurement result M1 based on a self-capacitance of the first electrode 201 of the touch sensor 200, and a second measurement result M2 based on a mutual capacitance between the first and the second electrodes 201, 202 of the touch sensor 200. The algorithm module 102 of the electronic device 100 is electrically coupled to the capacitance measurement circuit 101 and is configured to receive the first and second measurement results M1, M2 from the capacitance measurement circuit 101. The algorithm module 102 is further configured to apply an algorithm to the first and second measurement results, thereby generating a resultant signal RS that is provided to the threshold comparator 103 of the electronic device 100. For example, the algorithm module 102 generates the resultant signal RS based on a difference between the self-capacitance, e.g., the first measurement result M1, and the mutual capacitance measurement, e.g., the second measurement result M2, or vice versa. Alternatively, the algorithm module 102 may generate the resultant signal RS based on a sum of or a ratio between the first and second measurement results M1, M2.

The electronic device 100 further comprises a threshold comparator 103 that is coupled to the algorithm module 102 and is configured to receive the resultant signal RS from the algorithm module 102. The threshold comparator 103 is further configured to compare the resultant signal RS to a threshold value, and to generate a comparison signal CS based on a result of the comparison. The threshold value may be a predetermined or calibrated fixed value that indicates a touch activation status of the touch sensor 200. For example, the threshold comparator 103 is configured to generate the comparison signal CS having a first comparison value if the resultant signal RS is greater than the threshold value, indicating a positive activation status of the touch sensor 200, e.g., an intended touch activation caused by a human finger, for instance. Accordingly, the threshold comparator 103 is configured to generate the comparison signal CS having a second comparison value if the resultant signal RS is less than (or equal to) the threshold value. This case can indicate a negative activation status of the touch sensor 200, e.g., no touch activation or if water is present or flows across the touch surface of the touch sensor 200.

The electronic device 100 further comprises an output module 104 that is electrically coupled to the threshold comparator 103 and is configured to receive the comparison signal CS. The output module 104 is further configured to provide an output signal OS based on the comparison signal CS, wherein the output signal OS is indicative of the activation status of the touch sensor 200. For example, the output signal OS has a first output value that is indicative of an intended touch activation of the touch sensor 200 if the comparison signal CS has the first comparison value, and has a second output value indicating a non-touch or an unintended touch event, e.g., by water, if the comparison signal CS has the second comparison value.

Figure 2:
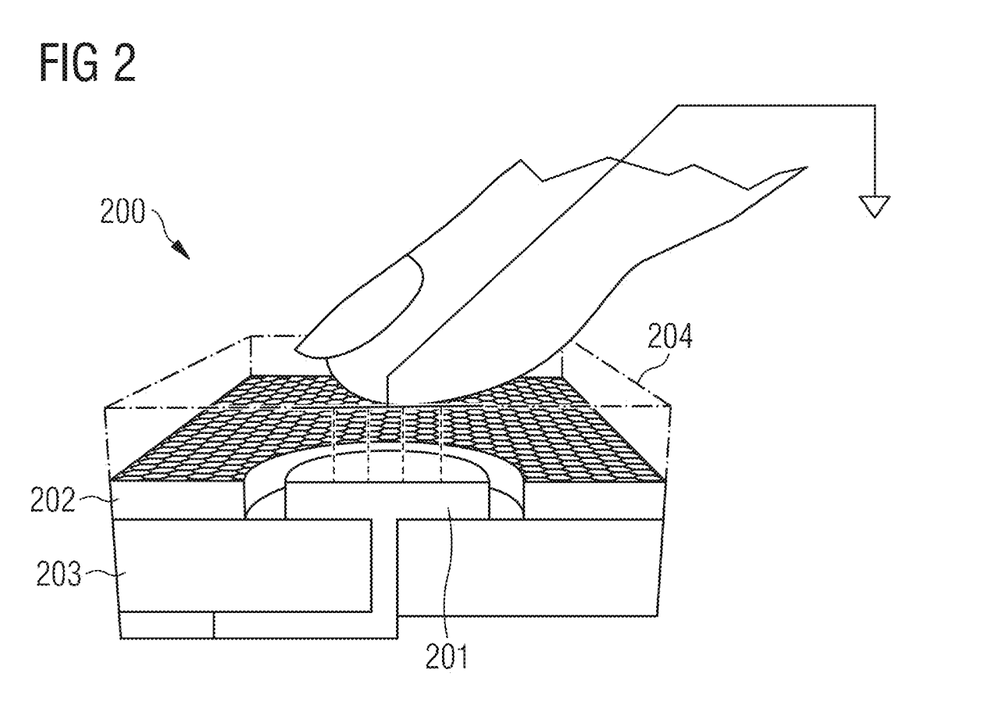
FIG. 2 illustrates the working principle of acquiring a self-capacitance measurement from an example touch sensor device.
Figure 4:
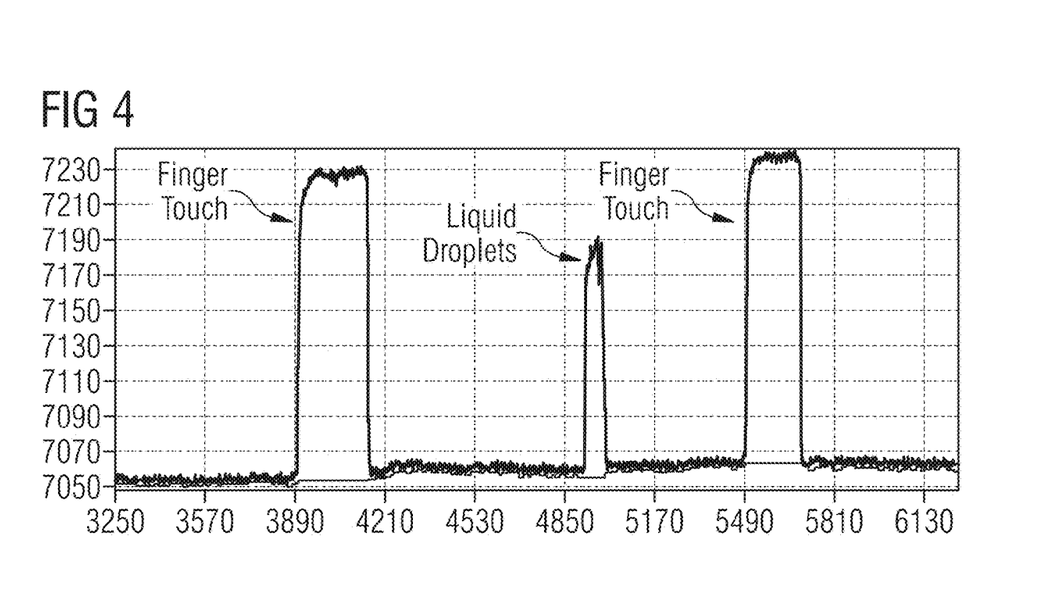
FIG. 4 illustrates a self-capacitance measurement using an example touch sensor device.

FIG. 2 illustrates the working principle of acquiring a self-capacitance measurement from a touch sensor 200. Like in FIG. 1, the touch sensor 200 comprises a first electrode 201 and a second electrode 202, which in this example implementation surrounds the first electrode 201 as illustrated. The first and second electrodes 201, 202 are arranged on a substrate 203 and covered by a protective layer 204 providing a touch surface. For a self-capacitance measurement, the second electrode 202 can be set to act as a ground hatch. The first electrode 201 can then be used to measure the apparent capacitance between the first electrode 201 and the ground of the touch sensor circuit. In general, the capacitance is formed by the combination of parasitic, sensor, and ground return capacitance. In combination, these contributions constitute the 'untouched' or default capacitance as the apparent capacitance. When a touch contact is applied, e.g., by a human finger as depicted, the apparent sensor capacitance is increased by the introduction of a parallel path to earth through the 'Human Body Model' (HBM). This forms a touch capacitance as a series combination with the HBM capacitance and ground to earth capacitance Cg. This increase is referred to as the touch 'delta'. FIG. 4 illustrates the difference between a touch sensor 200 in the untouched and touched state.

Figure 3:
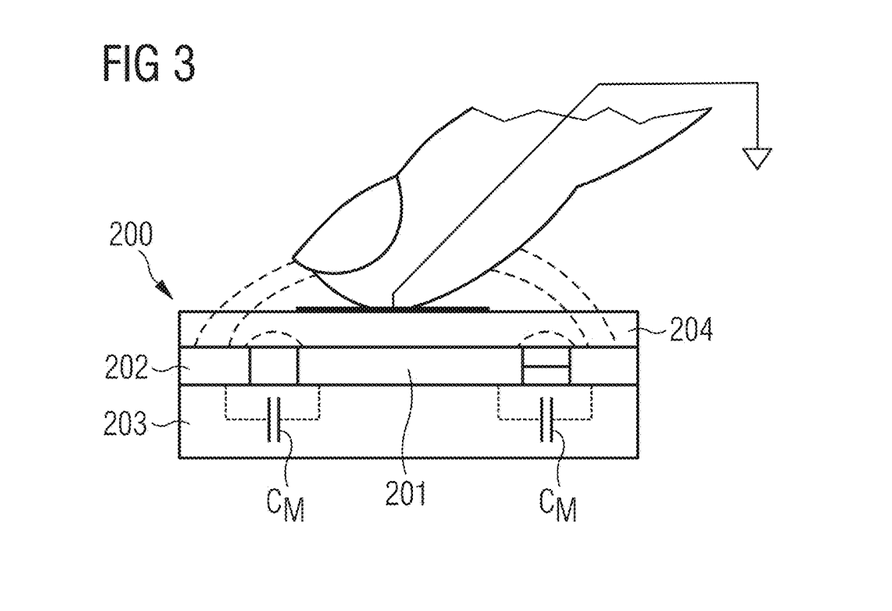
FIG. 3 illustrates the working principle of acquiring a mutual capacitance measurement from an example touch sensor device.

FIG. 3 illustrates the working principle of acquiring a mutual capacitance measurement from a touch sensor 200.

Like in FIGS. 1 and 2, the touch sensor 200 comprises a first electrode 201 and a second electrode 202. The first and second electrodes 201, 202 are arranged on a substrate 203 and covered by a protective layer 204 providing a touch surface. For a mutual capacitance measurement, the capacitance between the first electrode 201 and the second electrode 202 is detected. In an untouched state, the measured capacitance corresponds to the base capacitance of the touch sensor 200. When a touch contact is applied, e.g., by a human finger as depicted, the user's fingertip interacts with the electric field between the first and second electrodes 201, 202, which in turn leads to an apparent capacitance as an equivalent overall capacitance formed by two capacitors in series. The concepts of both, self-capacitance and mutual capacitance measurements by themselves are well-established and not further detailed throughout this disclosure.

FIG. 4 illustrates a self-capacitance measurement using an example touch sensor 200 as shown in FIG. 2, for example. The graph shows a sensor signal in arbitrary units on the y-axis versus time plotted along the x-axis. As can be seen, both a finger touch and water droplets on the touch surface significantly increase the self-capacitance of the touch sensor 200. However, using purely a self-capacitance measurement for determining a touch event may lead to false positive events as the distinction between a human finger and water droplets, or water flow across the touch surface, can be difficult or even impossible particularly for larger amounts of water on the sensor or a small contact surface between finger and touch surface.

Figure 5:
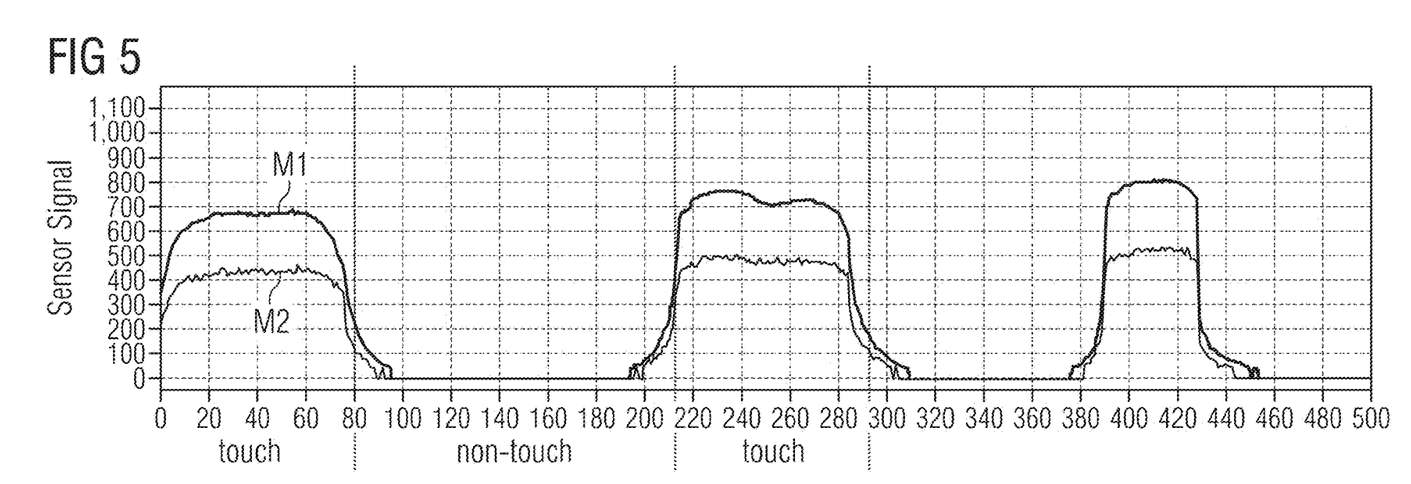
FIGS. 5-7 illustrate self-capacitance and mutual capacitance measurements obtained from an example touch sensor via an example electronic device.

FIG. 5 illustrates self-capacitance and mutual capacitance measurements obtained from the example touch sensor 200 of FIG. 1 via the capacitance measurement circuit 101, for instance, in the events of a touch by a human finger and non-touch. Again, the graph shows the first measurement signal M1 as the self-capacitance measurement and the second measurement signal M2 as the mutual capacitance measurement in arbitrary units on the y-axis versus time plotted along the x-axis. As can be seen, during the non-touch periods of time, both the self-capacitance and the mutual capacitance are at a low level. In the event of a touch with a finger, both the first measurement signal M1 of the self-capacitance and the second measurement signal M2 of the mutual capacitance significantly increase with the self-capacitance signal being consistently greater than the mutual capacitance by a relatively constant value when neglecting the onset and offset of the touch event, e.g., the rising and falling slopes. Thus, the algorithm module 102 can be configured to form the difference between the first measurement result M1 and the second measurement signal M2 as the resultant signal RS. The threshold value that the resultant signal RS is compared against using the threshold comparator 103 can be set appropriately to distinguish between a touch and a non-touch event in a straight-forward manner during a calibration of the touch sensor device 300, for instance. As the self-capacitance in this example reaches a signal level of approximately 700 arb. units and the mutual capacitance reaches a signal level of approximately 500 arb. units in a touch event with a human finger, the resultant signal formed as the difference would be characterized by a signal level of approximately 200 arb. units. Thus, the threshold value could be set to 100 arb. units, for instance. The values given as mentioned merely constitute examples to familiarize the skilled person with the working principle of the electronic device 100 according to the disclosure. Actual signal levels and their units may differ between devices and depend on an actual application.

Figure 6:
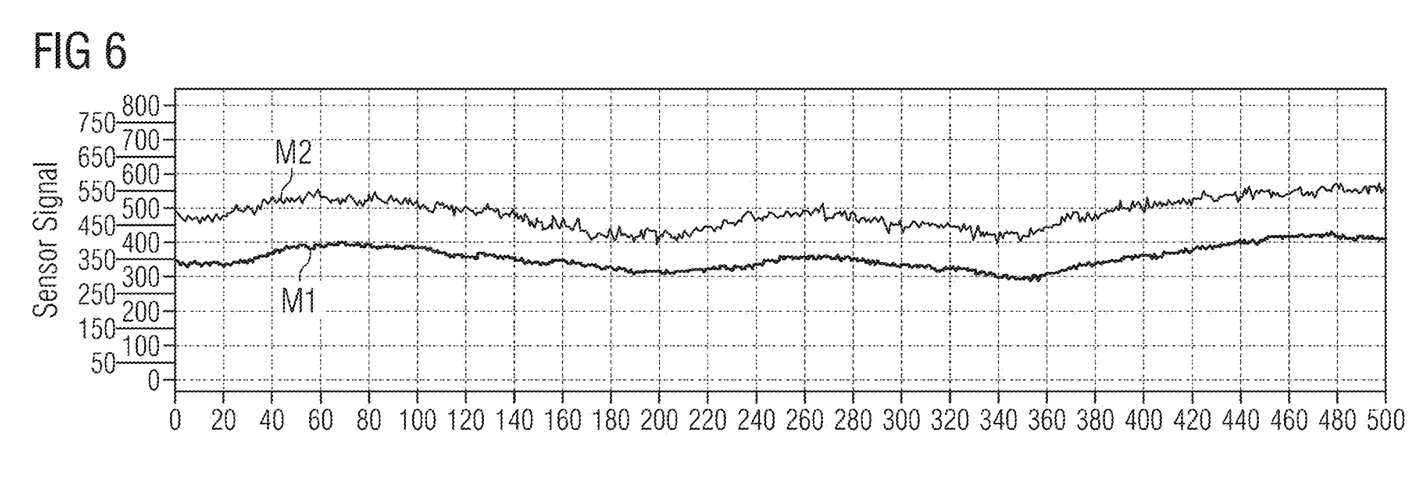

FIG. 6 illustrates self-capacitance and mutual capacitance measurements obtained from the example touch sensor 200 of FIG. 1 via the capacitance measurement circuit 101, for instance, in the event of water droplets located on the touch surface of the touch sensor 200 or water flowing across the touch surface. It is immediately apparent that again both the first measurement result M1 from the self-capacitance measurement and the second measurement result M2 from the mutual capacitance measurement differ from zero (cf. FIG. 5 during the non-touch event). However, in the event of water on the touch surface, the first measurement result M1 from the self-capacitance measurement is consistently less than the second measurement result M2 from the mutual capacitance measurement by a relatively constant value. Thus, the algorithm module 102 forming the difference between the first measurement result M1 and the second measurement signal M2 as the resultant signal RS in this event results in the resultant signal RS being of a negative value, e.g., approximately −150 arb. units in this example. Hence, the example threshold value of 100 arb. units described in context with FIG. 5, will for the water event reliably yield a negative output indicating a non-touch event. Thus, a determination of a touch activation of a touch sensor 200 can be accurately and reliably performed using an electronic device 100 according to the present disclosure that relies on both a self-capacitance and a mutual capacitance measurement.

Figure 7:
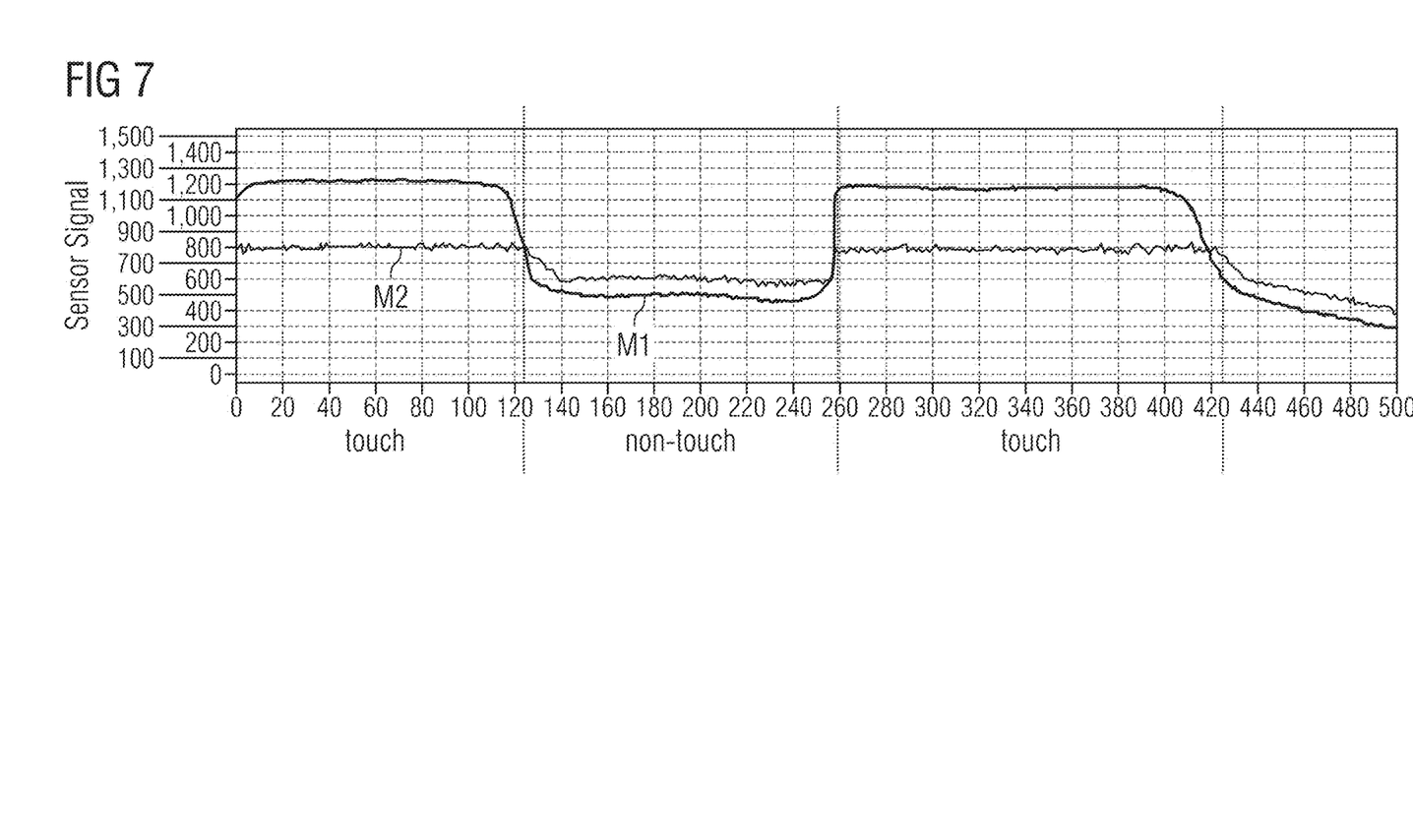

FIG. 7 illustrates self-capacitance and mutual capacitance measurements obtained from the example touch sensor 200 of FIG. 1 via the capacitance measurement circuit 101, for instance, in the event of water droplets located on the touch surface of the touch sensor 200 or water flowing across the touch surface, and a human finger touching the touch surface periodically. In other words, FIG. 7 illustrates a finger touch on a wet sensor surface. Again, it can easily be identified that during an intended touch event with a human finger, the first measurement signal M1 from the self-capacitance is greater than the second measurement signal M2 from the mutual capacitance measurement. In the non-touch event, this relationship is reversed. Again, the threshold value of the threshold comparator 103 allows for a straightforward distinction between an intended touch and a non-touch even with water being located on or flowing across the touch surface of the touch sensor 200.

Figure 8:
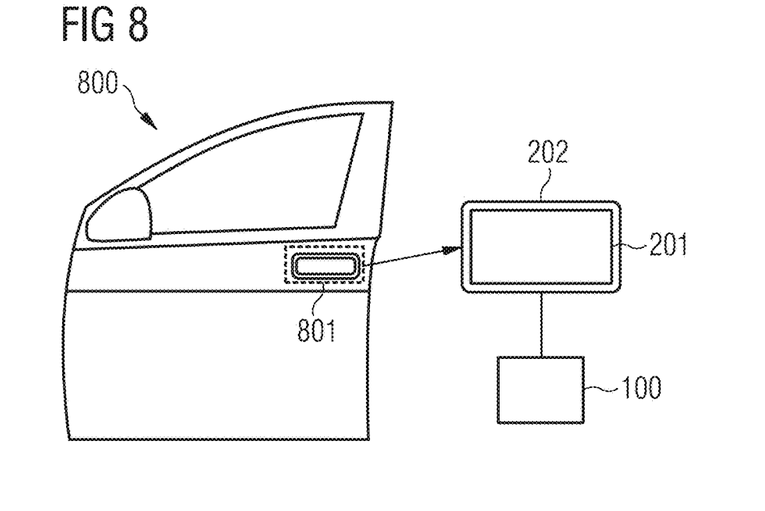
FIG. 8 illustrates an example application of a touch sensor device employed as a door handle of a car door.

FIG. 8 illustrates an example application of a touch sensor device 300 employed as a door handle 801 of a car door 800, in which the door handle 801 is realized as a touch sensor 200 having an inner first electrode 201 surrounded by an outer second electrode 202. Therein, the first electrode 201 serves for the obtaining of the first measurement signal M1 of the self-capacitance, and the second measurement signal M2 is obtained as the mutual capacitance between the first and second electrodes 201, 202. Alternatively, the touch sensor 200 could be employed as part of a door handle, e.g., as a touch sensitive surface of a door handle, wherein the outer second electrode 202 is separated from the first electrode 201 by a gap, for instance.

Figure 9:
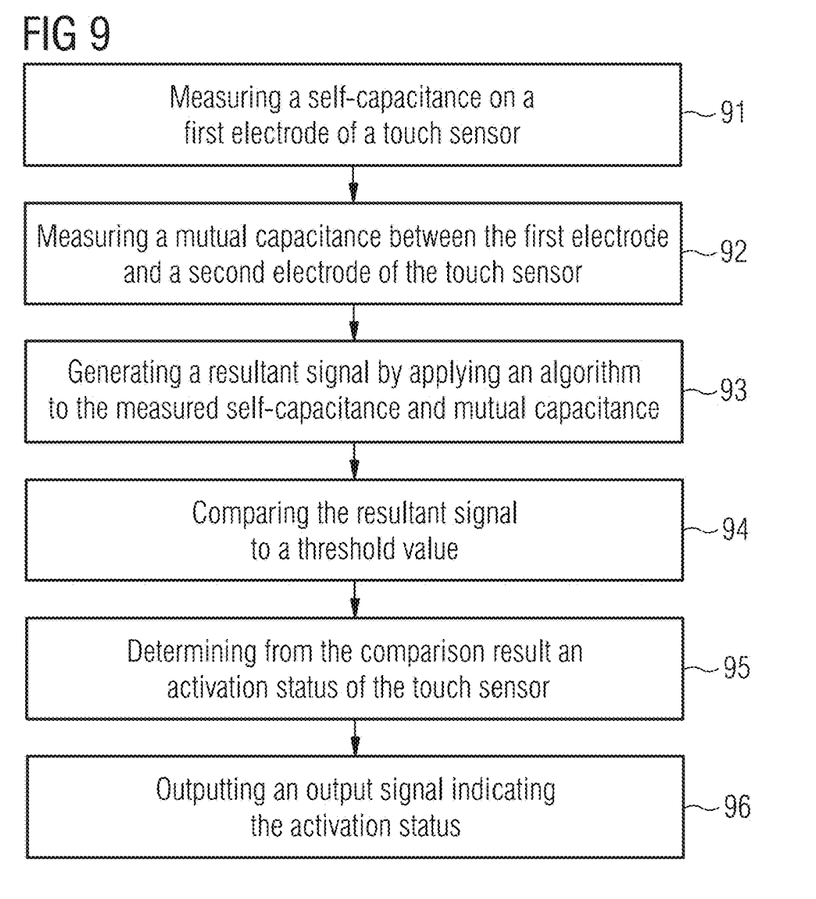
FIG. 9 shows a flow chart for illustrating the working principle of determining a touch activation of an example touch sensor using an example electronic device.

FIG. 9 shows a flow chart for illustrating the working principle of determining a touch activation of a touch sensor 200 using an electronic device 100 according to this disclosure. After obtaining the self-capacitance of a first electrode 201 of the touch sensor in a first step 91 and a mutual capacitance between the first and a second electrode 201, 202 in a second step 92, an algorithm is applied to the corresponding first and second measurement signals M1, M2, thus generating a resultant signal RS in a third step 93. For example, the resultant signal corresponds to a difference between the first and second measurement signals M1, M2. In a fourth step 94, the resultant signal RS is compared against a threshold value, which constitutes a signal level, at which an intended touch activation of the touch sensor 200 is to be confirmed, for instance. In a fifth step 95 the activation status of the touch sensor 200 is determined from the comparison signal CS, and an output signal OS is generated in a sixth step 96 indicating the determined activation status, e.g., indicating an intended touch event or a non-touch.

ASPECTS

The following provides an overview of some Aspects of the present disclosure:

Aspect 1: An electronic device for determining an activation status of a touch sensor. the electronic device comprising: a capacitance measurement circuit to be coupled to a touch sensor comprising a first electrode and a second electrode. the capacitance measurement circuit being configured to obtain a first measurement result based on a self-capacitance of the first electrode and a second measurement result based on a mutual capacitance between the first and the second electrodes; an algorithm module configured to apply an algorithm to the first and second measurement results, thereby generating a resultant signal; a threshold comparator configured to compare the resultant signal to a threshold value, and to generate a comparison signal having a first comparison value if the resultant signal is greater than the threshold value and a second comparison value if the resultant signal is less than the threshold value; and, an output module configured to provide an output signal based on the comparison signal. wherein the output signal is indicative of the activation status of the touch sensor.

Aspect 2: The electronic device according to Aspect 1, wherein the output module is configured to generate the output signal indicating: an activation of the touch sensor when the comparison result has the first comparison value; and no activation when the comparison result has the second comparison value.

Aspect 3: The electronic device according to Aspect 1 or 2, wherein the threshold value represents an activation level of the touch sensor with a conductive object, in particular a human body part, on the touch sensor.

Aspect 4: The electronic device according to one of Aspects 1 to 3, wherein the algorithm module is configured to generate the resultant signal based on a difference between the self-capacitance and the mutual capacitance.

Aspect 5: The electronic device according to one of Aspects 1 to 3, wherein the algorithm module is configured to generate the resultant signal based on a sum of the self-capacitance and the mutual capacitance.

Aspect 6: The electronic device according to one of Aspects 1 to 5, wherein the output module is configured to generate the output signal based on a plurality of comparison results obtained via applying the algorithm to a plurality of first and second measurements. thereby generating a plurality of resultant signals, and comparing each of the plurality of resultant signals to the threshold value.

Aspect 7: The electronic device according to one of Aspects 1 to 6, wherein the threshold comparator is further configured to compare the resultant signal to a further threshold value that is less than the threshold value, and to generate the comparison result having the second comparison value if the resultant signal is less than the further threshold value and a third comparison value if the resultant signal is greater than the further threshold value but less than the threshold value; and the output module is further configured to generate the output signal indicating: a first activation of the touch sensor when the comparison result has the first comparison value; no activation when the comparison result has the second comparison value; and a second activation of the touch sensor when the comparison result has the third comparison value.

Aspect 8: The electronic device according to Aspect 7, wherein the further threshold value represents an activation level of the touch sensor with water on the touch sensor.

Aspect 9: A touch sensor device comprising: a touch sensor comprising a first electrode and a second electrode; and an electronic device according to one of Aspects 1 to 8; wherein the capacitance measurement circuit is coupled to the first and second electrodes of the touch sensor.

Aspect 10: The touch sensor device according to Aspect 9, wherein the first electrode is substantially surrounded by the second electrode with an electrically non-conductive gap being arranged between the first and the second electrodes.

Aspect 11: The touch sensor device according to Aspect 9, wherein the first electrode comprises a first surface area and the second electrode comprises a second surface area, wherein the first surface area is substantially surrounded by the second surface area.

Aspect 12: The touch sensor device according to one of Aspects 9 to 11, wherein for obtaining the second measurement result based on the mutual capacitance, the first electrode is configured as a transmitter electrode and the second electrode is configured as a receiver electrode.

Aspect 13: A method of determining an activation status of a touch sensor. the method comprising: measuring a self-capacitance on a first electrode of the touch sensor; measuring a mutual capacitance between the first electrode and a second electrode of the touch sensor; generating a resultant signal by applying an algorithm to the measured self-capacitance and mutual capacitance; generating a comparison result by comparing the resultant signal to a threshold value; and determining, based on the comparison result. the activation status of the touch sensor.

Aspect 14: The method according to Aspect 13, wherein applying the algorithm comprises applying a difference between the self-capacitance and mutual capacitance, or of respective signals derived from the self-capacitance and mutual capacitance.

Aspect 15: The method according to Aspect 13 or 14, wherein the threshold value represents an activation level of the touch sensor with a conductive object, in particular a human body part, on the touch sensor.

Although specific examples have been illustrated and described herein, it will be appreciated by those of ordinary skill in the art that a variety of alternate and/or equivalent implementations may be substituted for the specific examples shown and described without departing from the scope of the present implementation. This application is intended to cover any adaptations or variations of the specific examples discussed herein. Therefore, it is intended that this implementation be limited only by the claims and the equivalents thereof.

It should be noted that the methods and devices including its preferred implementations as outlined in the present document may be used stand-alone or in combination with the other methods and devices disclosed in this document. In addition, the features outlined in the context of a device are also applicable to a corresponding method, and vice versa. Furthermore, all aspects of the methods and devices outlined in the present document may be arbitrarily combined. In particular, the features of the claims may be combined with one another in an arbitrary manner.

It should be noted that the description and drawings merely illustrate the principles of the proposed methods and systems. Those skilled in the art will be able to implement various arrangements that, although not explicitly described or shown herein, embody the principles of the implementation and are included within its spirit and scope. Furthermore, all examples and implementations outlined in the present document are principally intended expressly to be only for explanatory purposes to help the reader in understanding the principles of the proposed methods and systems. Furthermore, all statements herein providing principles, aspects, and implementations of the implementation, as well as specific examples thereof, are intended to encompass equivalents thereof.

The invention claimed is:

1. An electronic device for determining an activation status of a touch sensor, the electronic device comprising:
   a capacitance measurement circuit configured to be coupled to a touch sensor, the touch sensor comprising a first electrode and a second electrode, and the capacitance measurement circuit being configured to obtain a first measurement result based on a self-capacitance of the first electrode and a second measurement result based on a mutual capacitance between the first electrode and the second electrode;
   an algorithm module configured to apply an algorithm to the first measurement result and the second measurement result to generate a resultant signal, wherein the algorithm module is configured to subtract the second measurement result from the first measurement result to generate the resultant signal;
   a threshold comparator configured to compare the resultant signal to a threshold value, and to generate a comparison signal having a first comparison value, indicating a touch event at the touch sensor, if the resultant signal is greater than the threshold value, and a second comparison value, indicating a non-touch event at the touch sensor, if the resultant signal is less than the threshold value; and
   an output module configured to provide an output signal based on the comparison signal, wherein the output signal is indicative of the activation status of the touch sensor.

2. The electronic device according to claim 1, wherein the output module is configured to generate the output signal indicating:
   an activation of the touch sensor when the comparison signal has the first comparison value; and
   no activation of the touch sensor when the comparison signal has the second comparison value.

3. The electronic device according to claim 1, wherein the threshold value represents an activation level of the touch sensor with a conductive object on the touch sensor.

4. An electronic device for determining an activation status of a touch sensor, the electronic device comprising:
   a capacitance measurement circuit configured to be coupled to a touch sensor, the touch sensor comprising a first electrode and a second electrode, and the capacitance measurement circuit being configured to obtain a first measurement result based on a self-capacitance of the first electrode and a second measurement result based on a mutual capacitance between the first electrode and the second electrode;
   an algorithm module configured to apply an algorithm to the first measurement result and the second measurement result to generate a resultant signal;
   a threshold comparator configured to compare the resultant signal to a threshold value, and to generate a comparison signal having a first comparison value if the resultant signal is greater than the threshold value and a second comparison value if the resultant signal is less than the threshold value; and
   an output module configured to provide an output signal based on the comparison signal, wherein the output signal is indicative of the activation status of the touch sensor,
   wherein the threshold comparator is further configured to:
      compare the resultant signal to a further threshold value that is less than the threshold value,
      generate the comparison result having the second comparison value if the resultant signal is less than the further threshold value, and
      generate a third comparison value if the resultant signal is greater than the further threshold value but less than the threshold value, and
   wherein the output module is further configured to generate the output signal indicating:
      a first activation of the touch sensor when the comparison signal has the first comparison value,
      no activation when the comparison signal has the second comparison value, and
      a second activation of the touch sensor when the comparison signal has the third comparison value.

5. The electronic device according to claim 4, wherein the algorithm module is configured to generate the resultant signal based on a sum of the self-capacitance and the mutual capacitance.

6. The electronic device according to claim 1, wherein the output module is configured to generate the output signal based on a plurality of comparison results obtained via applying the algorithm to a plurality of first measurements and a plurality of second measurements, thereby generating a plurality of resultant signals, and comparing each of the plurality of resultant signals to the threshold value.

7. The electronic device according to claim 4, wherein the algorithm module is configured to generate the resultant signal based on a difference between the self-capacitance and the mutual capacitance.

8. The electronic device according to claim 4, wherein the further threshold value represents an activation level of the touch sensor with water on the touch sensor.

9. A touch sensor device comprising:
   a touch sensor comprising a first electrode and a second electrode; and
   an electronic device comprising:
      a capacitance measurement circuit configured to obtain a first measurement result based on a self-capacitance of the first electrode and a second measurement result based on a mutual capacitance between the first electrode and the second electrode;
      an algorithm module configured to apply an algorithm to the first measurement result and the second measurement result to generate a resultant signal, wherein the algorithm module is configured calculate a difference between the second measurement result and the first measurement result to generate the resultant signal;
      a threshold comparator configured to compare the resultant signal to a threshold value, and to generate a comparison signal having a first comparison value, indicating a touch event at the touch sensor, if the resultant signal is greater than the threshold value, and a second comparison value, indicating a non-touch event at the touch sensor, if the resultant signal is less than the threshold value; and an output module configured to provide an output signal based on the comparison signal, wherein the output signal is indicative of an activation status of the touch sensor, wherein the capacitance measurement circuit is coupled to the first electrode and the second electrode of the touch sensor.

10. The touch sensor device according to claim 9, wherein the first electrode is substantially surrounded by the second electrode with an electrically non-conductive gap being arranged between the first electrode and the second electrode.

11. The touch sensor device according to claim 9, wherein the first electrode comprises a first surface area and the second electrode comprises a second surface area, and wherein the first surface area is substantially surrounded by the second surface area.

12. The touch sensor device according to claim 9, wherein to obtain the second measurement result based on the mutual capacitance, the first electrode is configured as a transmitter electrode and the second electrode is configured as a receiver electrode.

13. A method of determining an activation status of a touch sensor, the method comprising:

measuring a self-capacitance on a first electrode of the touch sensor;

measuring a mutual capacitance between the first electrode and a second electrode of the touch sensor;

generating a resultant signal by subtracting the mutual capacitance from the self-capacitance to generate the resultant signal;

generating a comparison result by comparing the resultant signal to a threshold value, wherein the comparison signal has a first comparison value, indicating a touch event at the touch sensor, if the resultant signal is greater than the threshold value, and wherein the comparison signal has a second comparison value, indicating a non-touch event at the touch sensor, if the resultant signal is less than the threshold value; and determining, based on the comparison result, the activation status of the touch sensor.

14. The method according to claim 13, wherein the threshold value represents an activation level of the touch sensor with a conductive object during water events, during which water is on the touch sensor.

15. The method according to claim 13, wherein determining the activation status of the touch sensor comprises:

determining that the touch sensor has been activated when the comparison signal indicates a first value; and determining that the touch sensor has not been activated when the comparison signal indicates a second value.

16. The method according to claim 13, further comprising:

providing an output signal indicative of the activation status of the touch sensor.

17. The electronic device according to claim 1, wherein the threshold value is configured to delineate between water events, including a water touch event and water non-touch event, during which water is on the touch sensor, and wherein the threshold value is configured to delineate between non-water events, including a non-water touch event and non-water non-touch event, during which water is not on the touch sensor.

18. The electronic device according to claim 1, wherein the touch event includes a water touch event, during which water is on the touch sensor during a touch of the touch sensor, and wherein the non-touch event is a water non-touch event, during which water is on the touch sensor during a non-touch of the touch sensor.

19. The touch sensor device according to claim 9, wherein the threshold value is configured to delineate between water events, including a water touch event and water non-touch event, during which water is on the touch sensor, and wherein the threshold value is configured to delineate between non-water events, including a non-water touch event and non-water non-touch event, during which water is not on the touch sensor.

20. The method according to claim 13, wherein the threshold value is configured to delineate between water events, including a water touch event and water non-touch event, during which water is on the touch sensor, and wherein the threshold value is configured to delineate between non-water events, including a non-water touch event and non-water non-touch event, during which water is not on the touch sensor.

* * * * *